United States Patent [19]

Ching-Tang

[11] Patent Number: 4,834,206
[45] Date of Patent: May 30, 1989

[54] HYDRAULIC DRIVE AUTOMOBILE HORIZONTAL DRIVING DEVICE

[76] Inventor: Huang Ching-Tang, 3Fl., No. 93, Sec. 2 Wu-Chang Street, Taipei, Taiwan

[21] Appl. No.: 54,741

[22] Filed: May 27, 1987

[51] Int. Cl.⁴ .............................................. B60S 9/14
[52] U.S. Cl. .................................................. 180/202
[58] Field of Search ........................ 180/202, 200, 199

[56] References Cited

U.S. PATENT DOCUMENTS

| | | | |
|---|---|---|---|
| 1,940,724 | 12/1933 | Mizzy et al. | 180/200 |
| 3,011,575 | 12/1961 | Bouet | 180/200 |
| 3,266,587 | 8/1966 | Roberts | 180/200 |
| 3,826,322 | 7/1974 | Williams | 180/202 |

FOREIGN PATENT DOCUMENTS

| | | | |
|---|---|---|---|
| 1062815 | 4/1954 | France | 180/202 |
| 1019385 | 2/1966 | United Kingdom | 180/202 |

Primary Examiner—John A. Pekar
Attorney, Agent, or Firm—Asian Pacific Int'l Patent & Trademark Office

[57] ABSTRACT

Four lift units are installed at the axle shaft of the car wheels and can be swung from the bottom plate by means of a hydraulic drive motor, to enable the car to move horizontally to the left or to the right into a parking space. Besides enabling the car to move horizontally for parking, the device can also be used for tire replacing or to perform a U-turn.

2 Claims, 6 Drawing Sheets

FIG·3

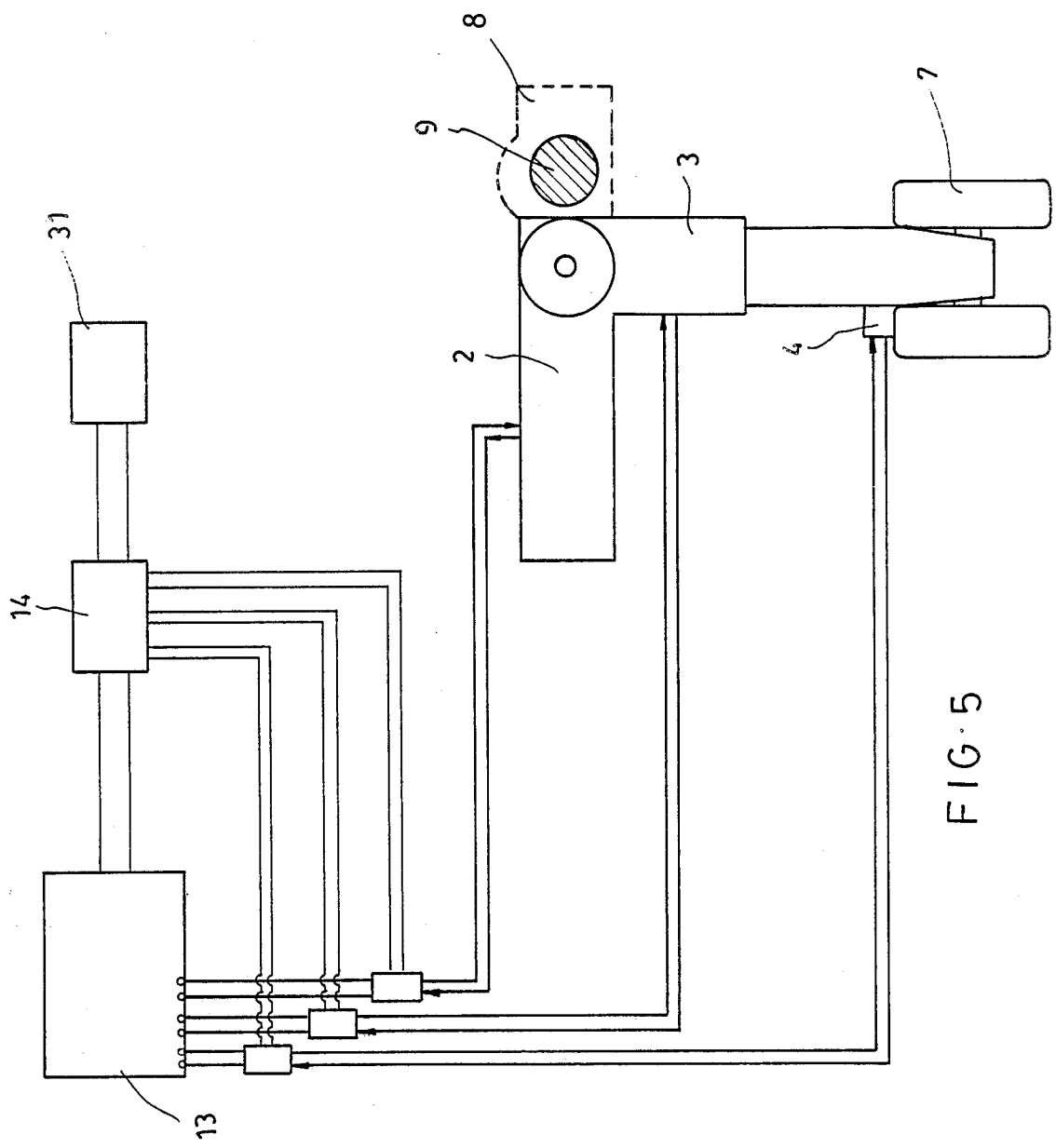
FIG·5

HYDRAULIC DRIVE AUTOMOBILE HORIZONTAL DRIVING DEVICE

BACKGROUND OF THE INVENTION

The automobile industry can be regarded a main or locomotive industry. Prosperous development of the automobile industry can bring prosperity to many branches of industry. The automobile is the primary means of transportation in many countries for people. It plays an important role in the present twentieth century, and so it will in the twenty-first century. An automobile is composed of more than a thousand parts and components. Manufacture of a car involves the combination of mechanical, electrical, electronic and materials engineering, and fine arts or styling. That is one of the reasons why the automobile industry can be regarded as a primary industry.

For the purpose of upgrading the local industry as well as laying the foundation for the respective technology, many countries in the world make large investments in the industry, with the view to establish large automobile plants. This has resulted in the availability of many large-scale automobile manufacturing plants, some having an annual production capacity of over 200,000 motor vehicles.

In large cities, motor cars are parking everywhere on the roads where parking space is very limited. It is often difficult to locate a parking lot which has sufficient space for easy parking. Usually the parking space available is of the same length as one's own car with not much space left which makes parking quite impossible, even though the driving skill of the driver may be excellent. Certainly a lot of time and effort will be needed for repeated trying before one can finally position the car into the parking space. In such a confined space bumping at the cars in front and behind one's own car is inevitable if one is not cautious.

The inventor has the belief that parking is something difficult to tackle from his own experiencce of becoming exhausted by parking his car.

There is accordingly the need for a parking device enabling the car to be parked in a parking space of the length as the car to be parked.

SUMMARY OF THE INVENTION

The device of the present invention includes four lifting units separately installed at the axle shaft near the bottom wall of a car. Each unit includes a telescopic leveller, hydraulic cylinder, hydraulic driving motor, a magnetic retainer valve, and controls therefor. When the car is driving horizontally, one can release the magnetic valve and start the telescopic leveller to enable the hydraulic cylinder to run from the horizontal level to a 90° or vertical attitudde. One can extend the hydraulic cylinder and the 4 units can keep the four wheels of the car temporarily off the ground, with the car being entirely supported by the 4 wheels. Then one can start the hydraulic drive motor to enable the wheels to move forward or backward so as to enable the car to move horizontally either to the left or the right.

Another feature of the present invention resides in the installing of the lifting units on the axle shaft of the bottom plate. At the time of withdrawing, each lifting unit is completely stored inside the bottom plate of the car so that nothing is projecting, so as not to affect normal driving.

One of the features of the present invention resides in the portability of the installation amounting to a total of 55 kg while generally the weight of the smallest car is 670 kg (empty) load. The devices of the present invention are evenly installed at four places at a car resulting in a uniform distribution of their weight which is very small in proportion with the total weight of a car, resulting in maintaining the stability of the car without affecting its fuel efficiency.

Another feature of the present invention resides in using the lifting units or using either the two wheels at the front or the two at the rear. When being used independently, no jack is required. If only the two front wheels or the rear ones are being used to facilitate a small radius turning of the car, any small lane can serve the said purpose.

BRIEF DESCRIPTION OF THE DRAWING

FIG. 5 illustrates the control circuit of the present invention.

DETAILED DESCRIPTION OF THE INVENTION

Figure 1:
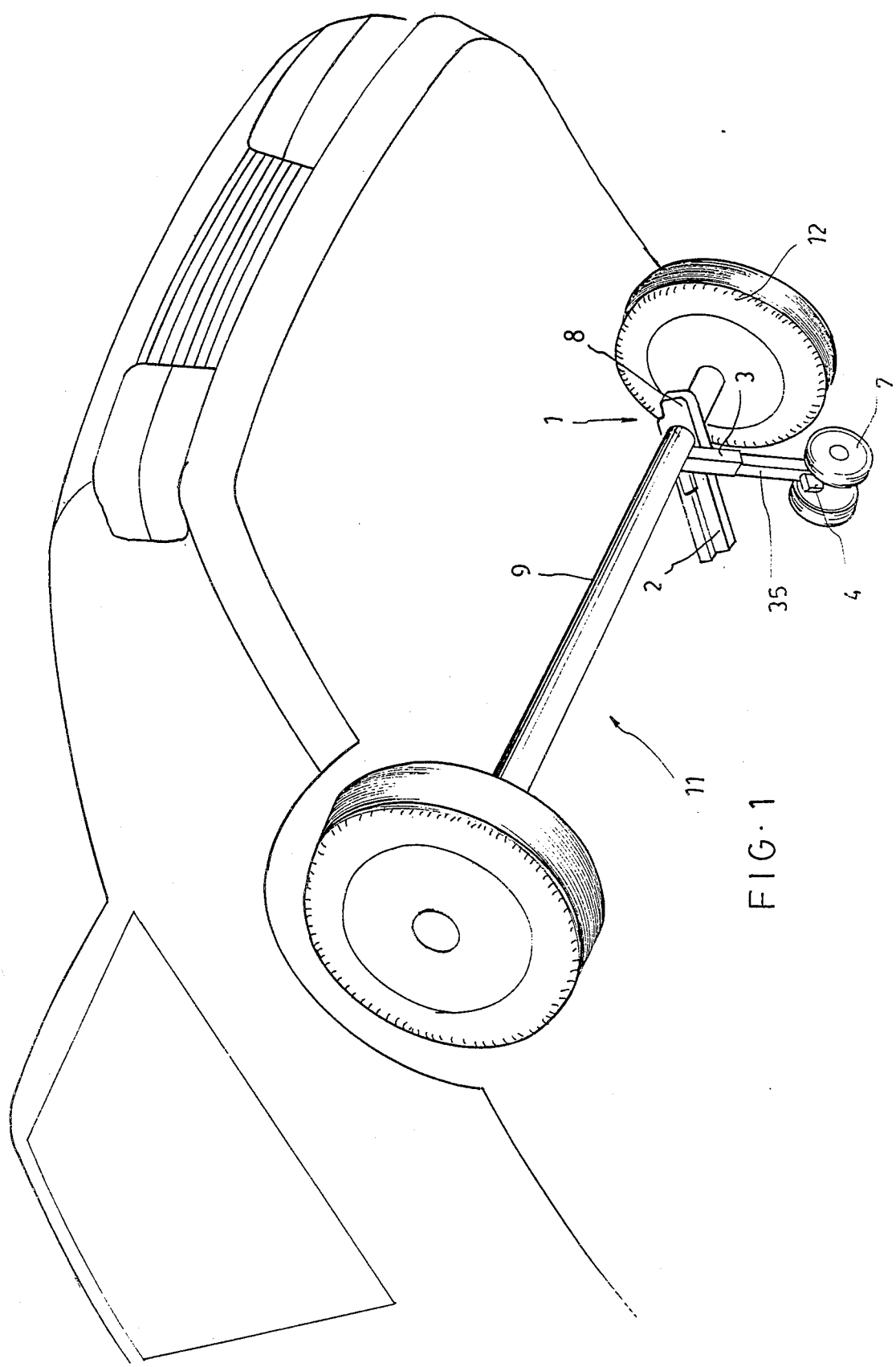
FIG. 1 is a perspective view of the parking device installed at the rear axle of a car.

With reference to FIG. 1, at the rear axle or axle shaft (9) of a car, the lifting unit (1) includes a telescopic leveller (2), a hydraulic cylinder (3), hydraulic drive motor (4), a magnetic valve (5), a brake (6), and wheels (7). One end of the telescopic leveller (2) is securely fixed at the axle shaft (9) by means of a fixed core tube (8), while the other end is locked on the bottom plate or wall (11) of the car by means of a spring (33) and rubber bellows (34), see FIG. 3. When not in use, the lifting unit is positioned at the level of the telescopic leveler (2), and the hydraulic cylinder (3) is fixed by the magnetic valve or retainer (5). For use, first release the magnetic valve (5), then making use of the telescopic leveller (2) under operation of the hydraulic drive motor (4), the hydraulic cylinder (3), with the end of the fixed core tube (8) serving as the center of the circle, is swung 90 degree so as to enable the hydraulic cylinder (3) to be positioned vertically. There is a pair of wheels (7) connected to the free end of the rod or shaft (35) of the hydraulic cylinder (3). The axis of rotation of the wheels (7) extends then perpendicularly with respect to the axis of rotation of the wheels (12) of the car.

Figure 2:
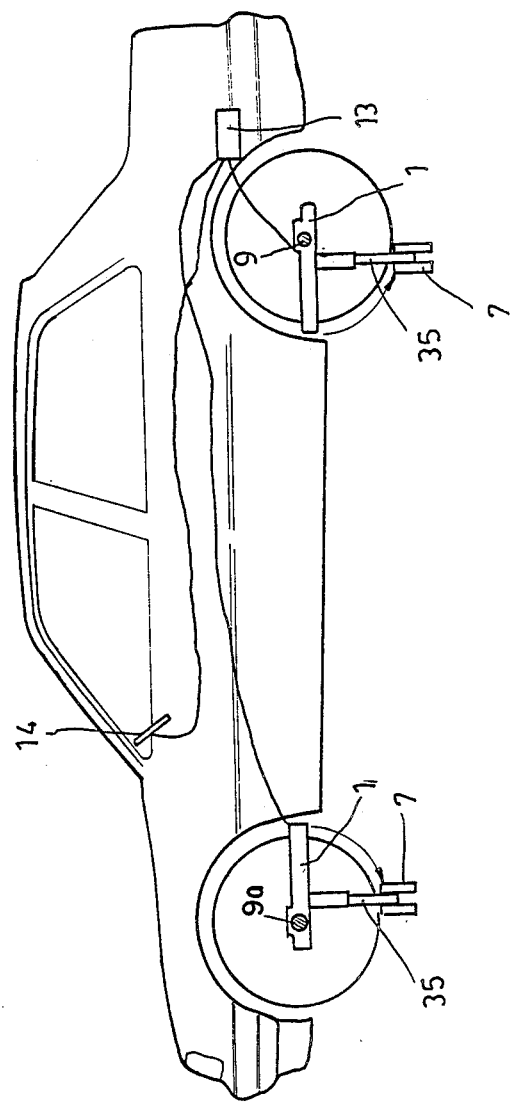
FIG. 2 is a side elevation of a car with the parking device of the present invention.

Please refer to FIG. 2 showing the installation of the present invention at an automobile. An automobile has 4 lifting units (1) separately installed in relative position next to the wheels (12) at the axle shafts (9) and (9a). The car has an hydraulic control device (13) (including a hydraulic pump, an electric motor, a pressure release valve, control valve (31), etc.) installed in the luggage compartment at the rear of the car. A circuit control device (14) is installed at a convenient position at the driver's seat. The circuit control device (14) controls the hydraulic control device (13) and the control valve (31) to enable the lifting units (1) to achieve the desired operation.

Figure 3:
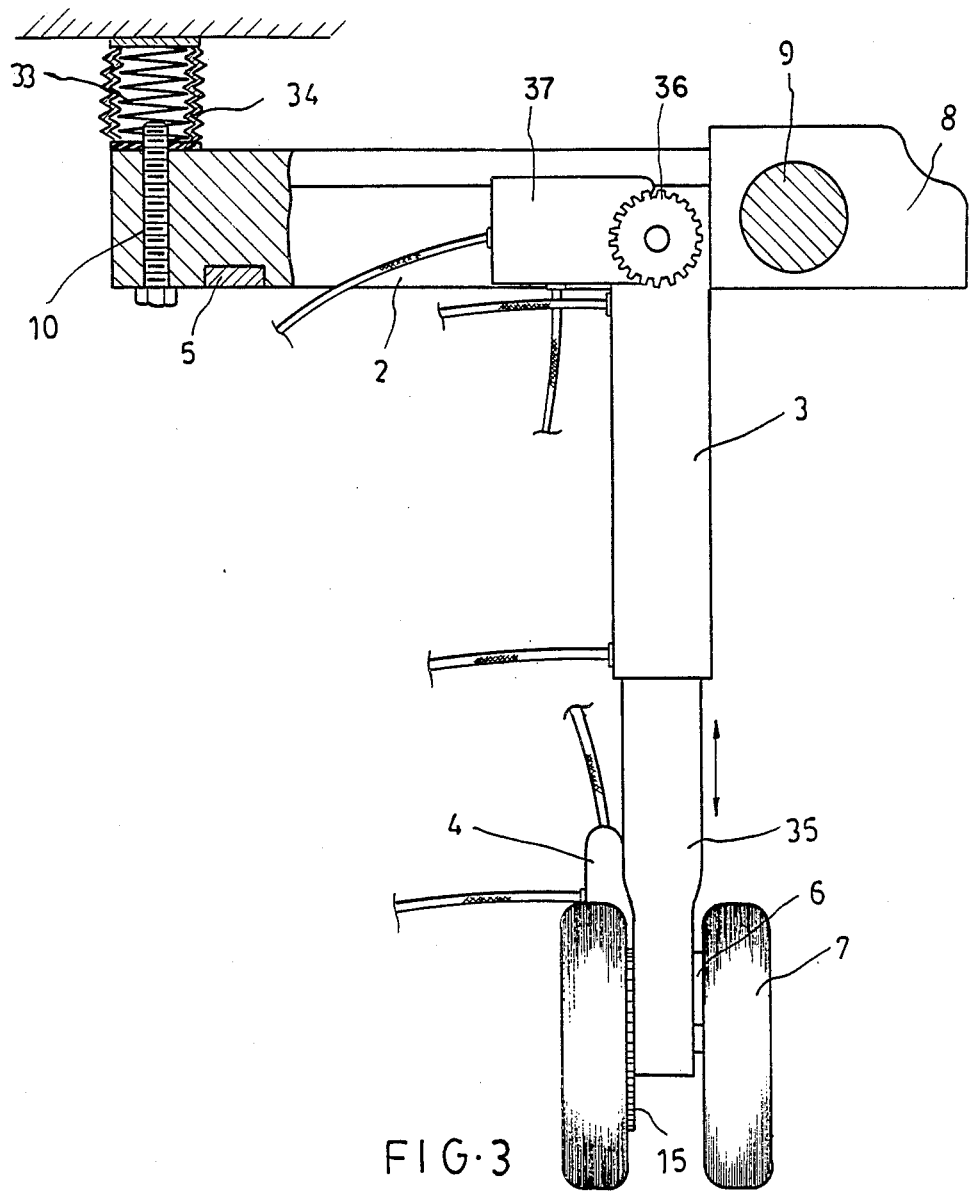
FIG. 3 is a partial cross-sectional view at the axle of the present invention.

Please refer to FIG. 3 which illustrates the rear axle shaft (9), at which the telescopic leveller (2) includes a hydraulic drive motor (37) and a gear (36). One end of the leveller (2) is fixed at the axle shaft (9) with a fixed core tube (8) while the other end is fixed securely to the bottom plate or wall of the car by means of the combination of the spring (33) and the rubber bellows (34). The telescopic leveller (2) is concealed under a levelled condition inside the bottom plate without projecting from the original structure of the bottom plate. The end of the fixed core tube (8) of the telescopic leveller (2) is the center of the circle of rotation of the cylinder (3), and the hydraulic pressure of the hydraulic drive motor (37), so as to drive the gear (36), swings the hydraulic cylinder (3) through 90 degrss to the extent of causing the hydraulic cylinder (3) to be in a vertical position with respect to the ground. The shaft (35) of the hydraulic cylinder (3) is capable of being extended under the pushing force of the hydraulic pressure. A set of wheels (7) is installed on the free end of the shaft (35). At the internal lateral side there is a round gear (25) which matches with the hydraulic drive motor (4) which can carry out clockwise and anticlockwise operation under the driving force of the hydraulic pressure, and to enable the wheels (7) to conduct the swing motion as aforesaid. The telescopic leveller (2), hydraulic cylinder (3) as well as the hydraulic drive motor (4) are connected to the hydraulic control valve (31) to alter the direction.

Figure 4:
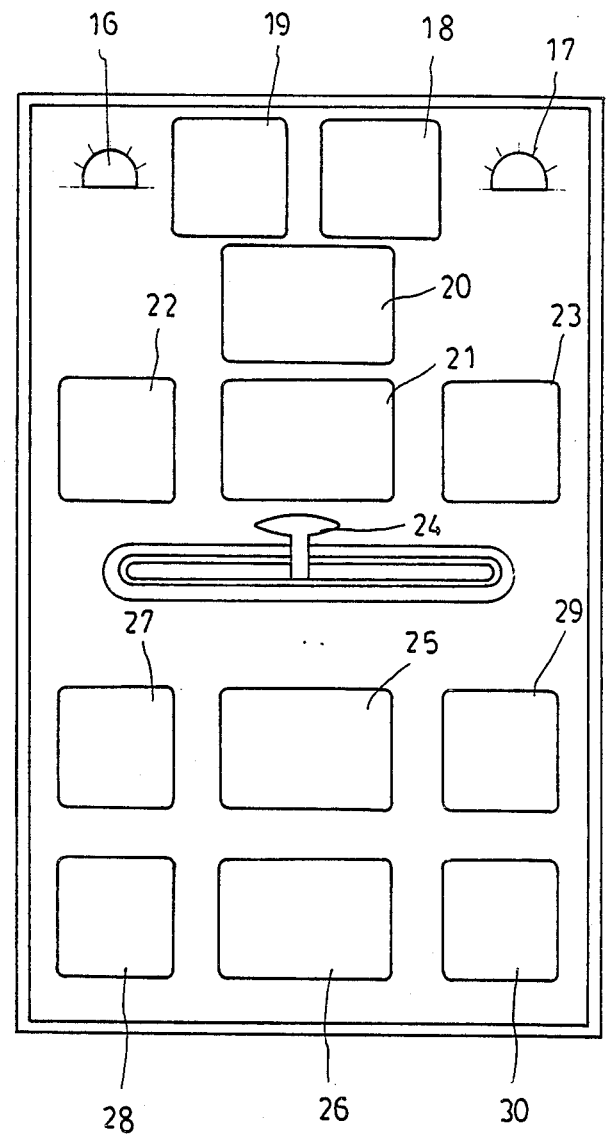
FIG. 4 is plan view of the control panel for the present invention.

Please refer to FIG. 4, which illustrates the control panel for the present invention, and by which the hydraulic cylinder (3) can have two stages of lifting to increase the practical use. The neutral indicating light (16) and the electric source indicating light (17) of the parking device in operation both indicate the current condition.

The electric source switch (18) is used to start the device. Any time when the return key (19) is being pressed down the device will be returned to its pre-operation condition. The telescopic leveller key (20) and the lifting key (21) are used for general horizontal driving purposes. For two left wheels there is a second stage lifting key (22) and the two right wheels have a second stage key (23). These are used for the parking to be conducted on the spot on a special irregular location. The control lever (24) is used for left and right horizontal driving. The lever (24) is installed in the middle and serves as a neutral gear and brake. There are six keys beneath the control lever (24), i.e., the independently functioning horizontal driving key of the two front wheels (25) and the independently functioning horizontal driving key of the two rear wheels (26) are used for the swiveling in a radial arc. There are four exterior keys, the left ffront lifting key (27), the left rear lifting key (28), the right front lifting key (29) and the right rear lifting key (30). They can only actuate the function of a single lifting unit (1) for tire replacing without the need of a jack.

Plese refer to FIG. 5 which illustrates the control system of the present invention, in which the circuit control device (14) includes a batter (31) as power source; and the hydraulic control device (13), the control valve (31) to change the hydraulic pressure so as to drive the telescopic leveller (2), the hydraulic cylinder (3) and the hydraulic drive motor (4). This diagram only shows one lifting unit (1).

Figure 6A:
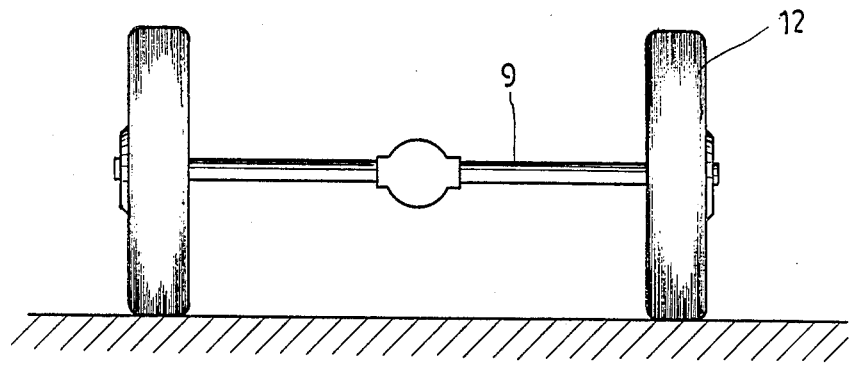
FIGS. 6A, B, and C illustrate the elevation of the car wheels away from the ground.
Figure 6B:
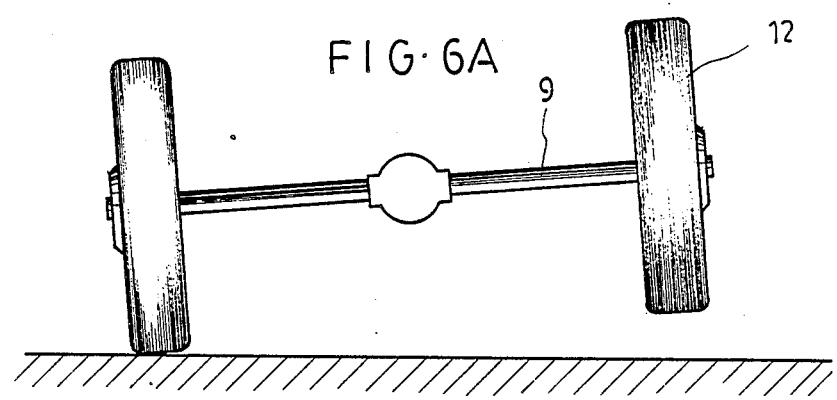
Figure 6C:
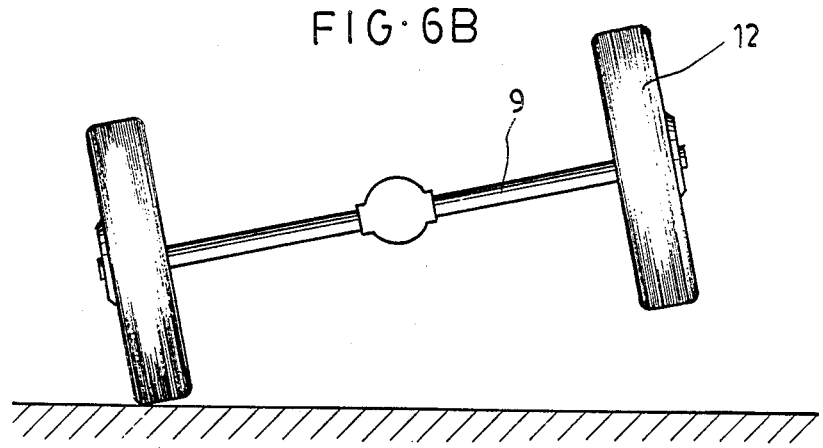

Please refer to FIG. 6 which indicates diagrammatically the elevating of the wheels away from the ground after they have been lifted. FIG. 6A is an example illustrating the axle shaft (9) being above the ground, under normal condition, usually at a height of approximately 22 cm. FIG. 6B indicates the first stage of the lifting up of the hydraulic cylinder (3) in which the axle shaft (9) is kept at one side 31 cm from the ground and the bottom edge of the tire (12) is 9 cm away from the ground. FIG. 6C indicates the second stage of the lifting up of the hydraulic cylinder (3), in which the wheel (12) is keept 40 cm above and the bottom edge of the tire (12) is 18 cm above the ground.

The present invention changes the traditional horizontal parking and even allows tire replacement without the use of a jack. When the automobile at which is installed the horizontal parking device, is being parked, the gear is turned to the neutral. The apparatus can only be started when the neutral gear indicating light is on. Otherwise it will be locked automatically. Press the electric source switch (18) to start the device of the present invention when horizontal parking is required. The electric source indicating light (17) indicates that normal activity is being conducted under the self-test of the circuit. Then one can press the telescopic leveller (20) and lower the hydraulic cylinder (3) which will then be in a vertical position with the ground but not yet been lifted or extended and that is why the wheels (7) do not engage the ground. Then one can press the lifting key (21) to enable the hydraulic cylinders (3) to lift at the same time, pressing the wheels (7) against the ground and causing the original wheels (12) to keep 9 cm distance away from the ground. Then one can push the control lever (24) allowing the car to move horizontally either to the left or to the right. When the desired movement has been done for parking the car at the desired target, one can push the control lever (24) back to the middle. The hydraulic drive motor (4) will stop generating power at this time while the brake will stop the wheels (7) from moving. Finally, one can press the return key (19) to cause the withdrawing of the hydraulic cylinders (3). The telescopic levellers (2) will lift the hydraulic cylinders (3) to line up at the same level. Then the wheels (12) of the car will resume their normal position on the ground. When the car is being driven in a narrow lane or has to change its direction of driving, one can press either the independently functioning horizontal driving key (25) of the two front wheels or the independently functioning horizontal driving key (26) of the rear two wheels. Only the lifting unit (1) of either the two front wheels or the two rear wheels should be descended to enable the car to use the original wheels (12) as the center of the circle and the distance from the wheels (12) of the car to the lifting unit (1) as the radius to directly conduct a round turn, or a U-turn.

For changing a tire, or have it disassembled for repairing, all one needs is to select and press down on any key which seems appropriate from the following keys: the left front, left rear, right front or right rear lifting key named separately under number (27), (28), (29), and (30). In this way, the desired disassembling of a tire will be achieved without requiring of a jack. If the level of the road on the two sides of a garage or road on which the car is located is uneven, one can press the second stage lifting key of either the one on the left or the one on the right (22) and (23) to balance the body of the car.

No matter under what conditions, instant termination of the operation of the device according to the invention can be achieved by simply pressing the return key (19), which will be followed by the automotic withdrawing of the hydraulic cylinder (3), the returning of the hydraulic cylinder (3) to be withdrawn into the bottom plate, caused by the telescopic leveller (2) and the automotic switching off of the electric current. Continual functioning of any of the functions of the present invention may be resumed by pressing the return key again to get it started.

I claim:

1. Apparatus for parking a car, said car having at bottom plate and wheels at an axle shaft, said apparatus comprising:

for each wheel a hydraulic lift unit at said axle shaft to enable a respective car wheel to be lifted temporarily so as to allow the car to directly perform a horizontal movement for parking and turning, each unit including:

a telescopic leveller including a fixed core tube, a hydraulic drive motor, and a gear adapted to be driven by said hydraulic motor, said telescopic leveler being locked to said axle shaft with its first end and the second end, by means of the combination of a spring and rubber bellows, is secured at said bottom plate but without affecting shock absorption of said car, and said telescopic leveller is connected in a right angle attitude at said axle shaft;

a hydraulic cylinder, said hydraulic cylinder having an attachement end which is operatively connected to said fixed core tube of said telescopic leveller, said hydraulic cylinder being adapted to be arranged in line with said telescopic leveller in the bottom plate when in retracted position, and for the extended position said hydraulic cylinder being adapted to swing, using said attachment end as the center of a circle of rotation, until it extends vertically with respect to the ground;

a pair of auxiliary wheels secured at the end opposite of the attachment end of said hydraulic cylinder to support the car on the ground;

gear means arranged laterally in at least one of said pair of auxiliary parking wheels;

a hydraulic drive motor means adapted to engage with said gear means of a respective pair of auxiliary parking wheels, said hydraulic drive motor means providing motive power for forward or backward motion of the respective auxiliary parking wheel to enable said car to move horizontally to the left and to the right;

brake means arranged laterally at least at one of said pair of auxiliary parking wheels for arresting movement of said pair of auxiliary parking wheels;

magnetic retainer means at the attachment end of said telescopic leveller for retaining said telescopic leveller when in the withdrawn position; and means for supplying power to said magnetic retainer means.

2. The apparatus according to claim 1, wherein elevation by a respective hydraulic lift unit is effected in stages such that during a first stage the respective wheel of said car has been lifted to keep a 9 cm distance away from the ground, and further including switch means connected to each hydraulic lift unit for enabling the respective two wheels either on the left and the right to keep at a distance of 18 cm away from the ground.

* * * * *